United States Patent
Asher

(10) Patent No.: US 7,169,876 B2
(45) Date of Patent: Jan. 30, 2007

(54) DUAL CURE POLYUREA COATING COMPOSITION

(75) Inventor: Richared E. Asher, Lewis Center, OH (US)

(73) Assignee: Freda Incorporated, Angola, IN (US)

( * ) Notice: Subject to any disclaimer, the term of this patent is extended or adjusted under 35 U.S.C. 154(b) by 192 days.

(21) Appl. No.: 11/017,299

(22) Filed: Dec. 20, 2004

(65) Prior Publication Data

US 2005/0106395 A1    May 19, 2005

Related U.S. Application Data

(63) Continuation-in-part of application No. 09/934,936, filed on Aug. 22, 2001, now Pat. No. 6,833,424.

(51) Int. Cl.
*C08G 18/32* (2006.01)

(52) U.S. Cl. .................. 528/68; 528/85; 428/423.1

(58) Field of Classification Search .................. 528/68, 528/85; 428/423.1
See application file for complete search history.

(56) References Cited

U.S. PATENT DOCUMENTS

| | | |
|---|---|---|
| 5,243,012 A | 9/1993 | Wicks et al. |
| 5,736,604 A | 4/1998 | Luthra |
| 6,458,293 B1 | 10/2002 | Roesler et al. |

*Primary Examiner*—Rachel Gorr
(74) *Attorney, Agent, or Firm*—Dinsmore & Shohl, LLP

(57) ABSTRACT

A two component polyurea coating composition that exhibits a dual cure phenomena. The coating composition comprises a polyaspartic ester that is combined together with a polyisocyanate in such a manner that the polyisocyanate is present is an amount that is greater than a normal stoichiometric amount for the polyaspartic ester. By over indexing the polyaspartic ester with the polyisocyanate advantages of moisture curing and or "fast curing" can be combined together in the final finish.

14 Claims, No Drawings

DUAL CURE POLYUREA COATING COMPOSITION

CROSS-REFERENCE TO RELATED APPLICATIONS

This application is a continuation-in-part of U.S. patent application Ser. No. 09/934,936, filed Aug. 22, 2001 now U.S. Pat. No. 6,833,424, the disclosure of which is hereby incorporated by reference.

BACKGROUND OF THE INVENTION

The present invention relates to a polyurea coating composition that can be applied as a wet finish on any substrate. More particularly, the present invention relates to a two component polyurea coating composition that exhibits a dual cure phenomena.

Two component coating compositions containing a polyisocyanate component in combination with an isocyanate-reactive such as a polyhydroxyl component or a polyamine are known. These coating compositions are suitable for the formation of high quality coatings and can be adjusted to produce coatings which are hard, elastic, abrasion resistant, solvent resistant and weather resistant.

Generally, there are two mechanisms by which the curing of polyurea coating compositions takes place-moisture cure or plural component "fast cure" which involves cross-linking the polyisocyanate component with an amine. Aliphatic coating compositions which rely upon moisture cure demonstrate very slow curing times which can limit their use in some applications. Coating compositions which rely upon plural "fast cure" are susceptible to adhesion problems when the curing proceeds too quickly.

In accordance with the present invention, polyurea coating compositions based on a two component system of a polyisocyanate component and a polyaspartic ester isocyanate-reactive component are produced which demonstrate a dual cure phenomena which results in improved film properties and curing times.

SUMMARY OF THE INVENTION

According to other features, characteristics, embodiments and alternatives of the present invention which will become apparent as the description thereof proceeds below, the present invention provides a polyurea coating composition that exhibits a dual cure phenomena, the polyurea coating composition including:
 a polyaspartic ester; and
 a polyisocyanate,
  wherein the polyisocyanate is present in an amount that is greater than a normal stoichiometric amount for the polyaspartic ester.

The present invention further provides a method of preparing a polyurea coating composition which involves:
 providing a polyaspartic ester;
 providing a polyisocyanate; and
 mixing the polyaspartic ester and the polyisocyanate together so that the polyisocyanate is present in an amount that is greater than a normal stoichiometric amount for the polyaspartic ester.

The present invention also provides a surface finish which comprises a cured composition that includes a polyaspartic ester and a polyisocyanate, wherein the polyisocyanate is present in an amount that is greater than a normal stoichiometric amount for the polyaspartic ester prior to curing.

The present invention still further provides a method for a forming a surface finish which involves:
 providing a polyaspartic ester;
 providing a polyisocyanate;
 mixing the polyaspartic ester and the polyisocyanate together so that the polyisocyanate is present in an amount that is greater than a normal stoichiometric amount for the polyaspartic ester;
 applying the mixed composition to a surface to form a surface coating; and
 allowing the applied surface coating to cure.

The present invention further provides a coated object of:
 a substrate; and
 a coating on the substrate of a polyurea coating composition including
  a polyaspartic ester, and
  a polyisocyanate, wherein the polyisocyanate is present in an amount that is greater than a normal stoichiometric amount for the polyaspartic ester, and wherein the coating composition cures dry to handle after air drying at 72° F. and 40% relative humidity in less than 120 minutes.

DETAILED DESCRIPTION OF THE INVENTION

The polyurea coating compositions of the present invention provide a hybrid curing system that combines the "fast cure" of a polyaspartic ester polyurea reaction with the enhanced adhesion and superior film properties of a slower curing moisture cure polyurea. The polyurea coating compositions of the present invention demonstrate enhanced adhesion, rapid cure rates and light stability, and can be used to produce bubble free, low to high film builds wit thicknesses that range from less that 1 mil to greater thank 20 mil.

The coating compositions of the present invention comprise two component polyureas that have exceptional direct-to-substrate adhesion and are based the use of a polyaspartic ester that is over indexed with a polyisocyanate. On component is a polyaspartic ester based component that can be pigmented or clear and incorporated with or without solvents. The other component is a polyisocyanate that can be incorporated with or without solvents.

Suitable polyisocyanates for use in accordance with the present invention include aliphatic polyisocyanates such as hexamethylenediisocyanate (HDI) and lysine diisocyanate; alicyclic polyisocyanates such as dicyclohexylene diisocyanate, isophorone diisocyanate (IPDI), cyclohexane diisocyanate (CHDI); aromatic polyisocyanates such as tolylene diisocyanate (TDI), diphenylmethane diisocyanate (MDI), naphthylene diisocyanate (NDI), xylylene diisocyanate (XDI) and tetramethylxylylene diisocyanate (TMXDI); and mixtures thereof. Higher functional Biruet polyisocyanates are usually preferred over trimers, dimmers, and hexamethylenediisocyanate (HDI) was found to be particularly useful for purposes of the present invention.

Suitable polyaspartic esters include single polyaspartic esters, or blends, such as those disclosed in U.S. Pat. Nos. 5,126,170; 5,243,012; 5,736,604 and 6,458,293, the disclosures of which are hereby incorporated by reference.

In formulating the coating compositions of the present invention, the polyaspartic ester is over indexed with an aliphatic polyisocyanate. That is, the polyisocyanate was used in an amount that is greater than the stoichiometric amount one would normally calculate for a specific amount of a polyaspartic ester. During the course of the invention, the applicant determined that measurable improvements in the film properties of a coating produced from the polyurea coating compositions of the present invention were obtained at an over indexing of the polyaspartic ester to a polyisocyanate at above about 1.5 NCO to NH. Optimum film properties were obtained without the use of a secondary catalyst at an over indexing of the polyaspartic ester to a polyisocyanate at above about 2.5±0.5 NCO to NH. When over indexing the polyaspartic ester with a polyisocyanate above about 3.0 NCO to NH, without the use of a secondary catalyst, the air dry cure times increase unfavorably.

Although not intending to be bound by an particular theory, and understanding that an applicant need not comprehend the scientific principles on which the practical effectiveness of his invention rests, applicant theorizes that by selectively over indexing the polyaspartic ester to the polyisocyanate, it is possible to reach an optimum balance between moisture curing and "fast curing" which involves cross-linking the polyisocyanate component with an aliphatic amine. When the mechanism of moisture curing predominates, surface adhesion is optimized; however, the curing times are very long and the film is susceptible to the formation of $CO_2$ bubbles when the applied dried film thickness exceeds 5 mil, or under high humidity conditions. When the cross-linking mechanism associated with fast curing predominates, surface adhesion is reduced in favor of quicker curing times. Applicant has determined that within an over indexing range of from about 1.5 up to about 3.0 of NCO to NH, the polyurea coating compositions of the present invention demonstrate a dual cure property in which the cross-linking mechanism associated with fast curing causes the surface of a coating to dry relatively fast, while the mechanism of moisture curing at the interface between the coating layer and substrate allows the coating composition to cure more slowly and thereby develop good adhesive properties.

The polyurea coating compositions of the present invention can be applied to virtually any surface as a wet coating which can be applied in any conventional manner such as spraying, dipping, brushing, etc. Once applied, if desired, the coatings can be air dried or forced dried according to conventional methods. The coating compositions can be suitably applied over a temperature range of about 40° F. to about 95° F. and relative humidity levels of about 40% to about 95%.

The polyurea coating compositions of the present invention have been found to produce finishes that have strong adhesion properties, high tensile strengths, chemical resistance to solvents and other chemical agents, resistance to ultraviolet light, and excellent color and gloss retention. The finishes are hard as well as impact and chip resistant, and can be recoated as desired. The coatings of the present invention can be applied to substrates such as cement, asphalt, metal, glass, and wood. The coatings may be used as an overcoat, on top of other coatings or treated surfaces such as zinc coated or zincated surfaces.

It is noted that the polyurea coating compositions can include single polyaspartic esters or blends of polyaspartic with or without additional catalytic agents. In addition, the compositions can include other conventional components such as pigments, dyes, fillers, carriers, solvents, surface texturing agents, etc. For convenience of field use, the two components of the compositions can be formulated to be mixed in a 1:1 ratio. Such a mixing ratio eliminates the need for measuring different amounts of the two components. The coating compositions have been determined to be particularly useful as an alternative to conventional coatings that require baking, when the parts or articles to be coated are too large or otherwise unsuitable for baking.

The following non-limiting examples were conducted to evaluate performance characteristics of the polyurea coating compositions of the present invention. The polyurea coating compositions tested in the following examples were non-pigmented clear coats that were applied at a dry film thickness (DFT) of 2 mil. The coating compositions were batch mixed and air spray applied.

Performance characteristics in the examples were evaluated using the following evaluation scale (ranging from 0 to 5):

0=Total Failure
1=Near Total Failure
2=Partial Failure
3=Marginal
4=Acceptable
5=Excellent

EXAMPLE 1

Crosshatch Adhesion

In this Example, non-pigmented coatings were tested according to the procedure set forth in ASTM 1-3359-95, Test Method B. The test results are presented in Table 1 below:

TABLE 1

| Stoichiometric Index | Untreated Cold Rolled Steel | Bonderite 1000 Pre-Treated Cold Rolled Steel | Grit Blasted Steel |
|---|---|---|---|
| 1.00 | 0 | 4 | 2 |
| 1.25 | 0 | 4 | 2 |
| 1.50 | 1 | 5 | 3 |
| 1.75 | 2 | 5 | 4 |
| 2.00 | 3 | 5 | 4 |
| 2.25 | 4 | 5 | 5 |
| 2.50 | 5 | 5 | 5 |
| 2.75 | 5 | 5 | 5 |
| 3.00 | 5 | 5 | 5 |

EXAMPLE 2

Conical Mandrel

In this Example, non-pigmented coatings were tested according to the procedure set forth in ASTM D 522-93, Test Method A. The test results are presented in Table 2 below.

TABLE 2

| Stoichiometric Index | Untreated Cold Rolled Steel | Bonderite 1000 Pre-Treated Cold Rolled Steel | Grit Blasted Steel |
|---|---|---|---|
| 1.00 | 0 | 3 | N/A |
| 1.25 | 0 | 4 | N/A |
| 1.50 | 0 | 4 | N/A |
| 1.75 | 1 | 5 | N/A |
| 2.00 | 2 | 5 | N/A |
| 2.25 | 4 | 5 | N/A |
| 2.50 | 5 | 5 | N/A |
| 2.75 | 5 | 5 | N/A |
| 3.00 | 5 | 5 | N/A |

EXAMPLE 3

Recoat, Chemical Resistance and Drying

In this Example, non-pigmented coatings were tested according to the procedures set forth in ASTM D 3359-95, Test Method B (for recoat) and ASTM D 1308-87 (for Chemical resistance using n-methyl N-methylpyrrolidinone (NMP), 37% HCl, 20% HCl, 100% acetic acid and 50% acetic acid). In addition, drying characteristics were tested as indicated. The test results are presented in Table 3 below.

TABLE 3

| Stoichiometric Index | Recoat After 48 Hour Cure: Intercoat Adhesion | Chemical Resistance After 30 Day Cure | Dry to Handle Air Dry @ 72° F. and 40% Relative Humidity @ 2 mils DFT |
|---|---|---|---|
| 1.00 | 0 | 2 | <30 Minutes |
| 1.25 | 1 | 3 | <45 Minutes |
| 1.50 | 2 | 3 | <45 Minutes |
| 1.75 | 3 | 3 | <45 Minutes |
| 2.00 | 4 | 4 | <45 Minutes |
| 2.25 | 5 | 4 | <60 Minutes |
| 2.50 | 5 | 5 | <60 Minutes |
| 2.75 | 5 | 5 | <75 Minutes |
| 3.00 | 5 | 5 | <120 Minutes |

EXAMPLE 4

Exposure to UV Light

In this Example, Gloss White coatings were tested according to the procedure set forth in ASTM D 4587-91, Procedure A (8 hour UV/70° C. followed by 4 hour CON/50° C.). The test results are presented in Table 4 below.

TABLE 4

| Stoichiometric Index | 42 Day QUV-B 60 Gloss | 42 Day QUV-B Delta E |
|---|---|---|
| 1.00–89.9 Gloss White | 52.1 | 0.609 |
| 2.50–96.2 Gloss White | 78.7 | 0.411 |

EXAMPLE 5

Black Semi Gloss

In this example Black Semi Gloss coatings were prepared as follows:

TABLE 5

| | # Raw Material | EqWt | Percent Solids | Suppl lb/gal | Solvent lb/gal | % H2O |
|---|---|---|---|---|---|---|
| 1. | ASPARTIC BLACK 430 | 313.00 | 100 | 9.17 | 0.00 | 0 |
| 2. | WOLLASTOCOAT M-400 AS | 0.00 | 100 | 24.20 | 0.00 | 0 |
| 3. | ACEMAT HK 188 | 0.00 | 100 | 17.50 | 7.51 | 0 |
| 4. | BYK 307 10% IN EA | 0.00 | 9 | 7.61 | 7.51 | 0 |
| 5. | ACETATE | 0.00 | 0 | 7.29 | 7.29 | 0 |
| 6. | DESMODUR N100 50% CUT | 382.00 | 50 | 8.40 | 7.53 | 0 |
| 1. | ASPARTIC BLACK 430 | 207.92 | 22.67 | 207.92 | 22.67 | 0 |
| 2. | WOLLASTOCOAT M-400 AS | 158.06 | 6.53 | 158.06 | 6.53 | 0 |
| 3. | ACEMAT HK 188 | 29.64 | 1.69 | 29.64 | 1.69 | 0 |
| 4. | BYK 307 10% IN EA | 1.80 | 0.24 | 0.16 | 0.02 | 0 |
| 5. | ACETATE | 137.23 | 18.82 | 0.00 | 0.00 | 0 |
| 6. | DESMODUR N100 50% CUT | 420.33 | 50.04 | 210.17 | 22.13 | 0 |
| 7. | Total | 954.99 | 100.00 | 605.95 | 53.05 | |

| | | | |
|---|---|---|---|
| Weight Solids, 2/3 = | 63.45 | Weight/gallon = | 9.55 |
| Volume Solids, 1/3 = | 53.05 | NCO: OH Ratio = | 1.66 |
| P/3 Ratio = | 0.45 | Mix Ratio = | 1.00 |
| PVC, % = | 15.51 | VOC, lbs/gal = | 3.49 |

Raw Material
1. a polyaspartic ester from Bayer Material Science, Pittsburgh, PA.
2. a surface modified wollastonite from NYCO, Calgary, Alberta, Canada
3. a filler/glass flattening agent from Degausa Corp., Düsseldorf, Germany
4. a silicon surface additive from Byk Chemie, Wessel, Germany
5. Acetate
6. An aliphatic polyisocyanate from Bayer Material Science, Pittsburgh, PA.

EXAMPLE 6

High Gloss White

In this example High Gloss White coatings were prepared as follows:

TABLE 6

| | # Raw Material | EqWt | Percent Solids | Suppl lb/gal | Solvent lb/gal | % H2O |
|---|---|---|---|---|---|---|
| 1. | DESMOPHEN 7053 | 277.00 | 100 | 8.83 | 0.00 | 0 |
| 2. | Ti-Pure R-900 | 0.00 | 100 | 33.30 | 0.00 | 0 |
| 3. | Aerosil 200 | 0.00 | 100 | 18.40 | 0.00 | 0 |
| 4. | Aerosil R-972 | 0.00 | 100 | 18.40 | 0.00 | 0 |
| 5. | Disperbyk-160 | 0.00 | 29 | 7.93 | 7.27 | 0 |
| 6. | BYK 307 10% IN EA | 0.00 | 9 | 7.61 | 7.51 | 0 |
| 7. | ACETATE | 0.00 | 0 | 7.29 | 7.29 | 0 |
| 8. | DESMODUR N-100/ea 30% | 272.00 | 70 | 8.90 | 7.51 | 0 |
| 1. | DESMOPHEN 7053 | 181.67 | 20.57 | 181.67 | 20.57 | 0 |
| 2. | Ti-Pure R-900 | 442.67 | 13.29 | 442.67 | 13.29 | 0 |
| 3. | Aerosil 200 | 1.89 | 0.10 | 1.89 | 0.10 | 0 |
| 4. | Aerosil R-972 | 2.83 | 0.15 | 2.83 | 0.15 | 0 |
| 5. | Disperbyk-160 | 4.72 | 0.59 | 1.37 | 0.13 | 0 |
| 6. | BYK 307 10% IN EA | 1.89 | 0.25 | 0.17 | 0.02 | 0 |
| 7. | ACETATE | 109.19 | 14.98 | 0.00 | 0.00 | 0 |
| 8. | DESMODUR N-100/ea 30% | 445.49 | 50.05 | 311.84 | 32.26 | 0 |
| 9. | Total | 1190.35 | 100.00 | 942.44 | 66.54 | |

| | | | |
|---|---|---|---|
| Weight Solids, 2/3 = | 79.17 | Weight/gallon = | 11.90 |
| Volume Solids, 1/3 = | 66.54 | NCO:OH Ratio = | 2.50 |
| P/B Ratio = | 0.91 | Mix Ratio = | 1.00 |
| PVC, % = | 20.41 | VOC, lbs/gal = | 2.48 |

Raw Material
1. a polyaspartic ester from Bayer Material Science, Pittsburgh, PA.
2. titanium dioxide from DuPont de Nemours, Willmington, Delaware.
3. a silicon from Degausa Corp., Düsseldorf, Germany
4. a silicon from Degausa Corp., Düsseldorf, Germany
5. a wetting agent from BYK Chemie, Wessel, Germany
6. a silicon surface additive from BYK Chemie, Wessel, Germany
7. Acetate
8. An aliphatic polyisocyanate from Bayer Material Science, Pittsburgh, PA.

EXAMPLE 7

Blended Aspartic

In this example a blend of polyaspartic esters was used to prepare coating as follows:

TABLE 7

| # | Raw Material | EqWt | Percent Solids | Suppl lb/gal | Solvent lb/gal | % H2O |
|---|---|---|---|---|---|---|
| 1. | DESMOPHEN 7053 | 277.00 | 100 | 8.83 | 0.00 | 0 |
| 2. | DESMOPHEN 7052 | 325.00 | 90 | 8.66 | 7.35 | 0 |
| 3. | Ti-Pure R-900 | 0.00 | 100 | 33.30 | 0.00 | |
| 4. | BAROTE 1075 | 0.00 | 100 | 33.00 | 0.00 | 0 |
| 3. | Aerosil 200 | 0.00 | 100 | 18.40 | 0.00 | 0 |
| 6. | Methyl Ethyl Ketone | 0.00 | 9 | 6.71 | 6.71 | 0 |
| 7. | DESMODUR N-100/ea 15% | 224.00 | 85 | 9.19 | 7.51 | 0 |
| 1. | DESMOPHEN 7053 | 122.83 | 13.91 | 122.83 | 13.91 | 0 |
| 2. | DESMOPHEN 7052 | 18.70 | 2.16 | 16.83 | 1.91 | 0 |
| 3. | Ti-Pure R-900 | 436.44 | 13.11 | 436.44 | 13.11 | 0 |
| 4. | BAROTE 1075 | 87.29 | 2.65 | 87.29 | 2.65 | 0 |
| 3. | Aerosil 200 | 4.36 | 0.24 | 4.36 | 0.24 | 0 |
| 6. | Methyl Ethyl Ketone | 288.07 | 25.01 | 0.00 | 0.00 | 0 |
| 7. | DESMODUR N-100/ea 15% | 229.84 | 25.01 | 195.37 | 20.42 | 0 |
| 8. | Total | 1187.53 | 100.00 | 863.12 | 52.22 | |

| | | | | |
|---|---|---|---|---|
| Weight Solids, ⅔ = | 72.68 | Weight/gallon = | | 11.88 |
| Volume Solids, ⅓ = | 52.22 | NCO:OH Ratio = | | 2.05 |
| P/B Ratio = | 1.58 | Mix Ratio = | | 3.00 |
| PVC, % = | 30.62 | VOC, lbs/gal = | | 3.24 |

Raw Material
1. a polyaspartic ester from Bayer Material Science, Pittsburgh, PA.
2. a polyaspartic ester from Bayer Material Science, Pittsburgh, PA.
3. titanium dioxide from Degausa Corp., Düsseldorf, Germany
4. barium sulfate
5. a silicon from Degausa Corp., Düsseldorf, Germany
6. Methyl Ethyl Ketone
7. an aliphatic polyisocyanate from Bayer Material Science, Pittsburgh, PA.

EXAMPLE 8

Metallic Over Indexed

In this example coatings having a metallic finish were prepared as follows:

TABLE 8

| # | Raw Material | EqWt | Percent Solids | Suppl lb/gal | Solvent lb/gal | % H2O |
|---|---|---|---|---|---|---|
| 1. | DESMOPHEN 7053 | 277.00 | 100 | 8.83 | 0.00 | 0 |
| 2. | Aerosil 200 | 0.00 | 100 | 18.40 | 0.00 | 0 |
| 3. | Sparkle Silver 5251-AR | 0.00 | 62 | 12.08 | 6.55 | 0 |
| 4. | BYK 307 10% IN EA | 0.00 | 9 | 7.61 | 7.51 | 0 |
| 5. | Acetate | 0.00 | 9 | 7.53 | 7.53 | 0 |
| 6. | DESMODUR N-100/ea 40% | 318.00 | 60 | 8.74 | 7.51 | 0 |
| 1. | DESMOPHEN 7053 | 241.97 | 27.40 | 241.97 | 27.40 | 0 |
| 2. | Aerosil 200 | 2.83 | 0.15 | 2.83 | 0.15 | 0 |
| 3. | Sparkle Silver 5251-AR | 54.67 | 4.53 | 33.90 | 1.35 | 0 |
| 4. | BYK 307 10% IN EA | 1.62 | 0.21 | 0.15 | 0.02 | 0 |
| 5. | Acetate | 134.10 | 17.81 | 0.00 | 0.00 | 0 |
| 6. | DESMODUR N-100/ea 40% | 436.09 | 79.90 | 261.65 | 25.67 | 0 |
| 7. | Total | 871.28 | 100.00 | 540.50 | 55.60 | |

| | | | | |
|---|---|---|---|---|
| Weight Solids, ⅔ = | 62.04 | Weight/gallon = | | 8.71 |
| Volume Solids, ⅓ = | 53.60 | NCO:OH Ratio = | | 1.37 |
| P/B Ratio = | 0.07 | Mix Ratio = | | 1.00 |
| PVC, % = | 2.71 | VOC, lbs/gal = | | 3.31 |

Raw Material
1. a polyaspartic ester from Bayer Material Science, Pittsburgh, PA.
2. a silicon from Degausa Corp., Düsseldorf, Germany
3. a metallic silver pigment
4. a silicon surface additive from BYK Chemie, Wessel, Germany
5. Acetate
6. an aliphatic polyisocyanate from Bayer Material Science, Pittsburgh, PA.

EXAMPLE 9

Blend with Aldimine

In this example a blend of polyaspartic esters was used to prepare coatings as follows:

TABLE 9

| # | Raw Material | EqWt | Percent Solids | Suppl lb/gal | Solvent lb/gal | % H2O |
|---|---|---|---|---|---|---|
| 1. | DESMOPHEN 7053 | 277.00 | 100 | 8.83 | 0.00 | 0 |
| 2. | DESMOPHEN 7052 | 325.00 | 90 | 8.66 | 7.35 | 0 |
| 3. | Desmophen XP-7076 | 139.00 | 100 | 7.30 | 0.00 | 0 |
| 4. | BYK 307 10% IN EA | 0.00 | 9 | 7.61 | 7.51 | 0 |
| 5. | Byk-321 | 0.00 | 52 | 7.51 | 7.52 | 0 |
| 6. | Acetate | 0.00 | 0 | 7.29 | 7.29 | 0 |
| 7. | Desmodur XP-7100 | 205.00 | 100 | 9.50 | 0.00 | 0 |
| 1. | DESMOPHEN 7053 | 214.31 | 24.27 | 214.31 | 24.27 | 0 |
| 2. | DESMOPHEN 7052 | 71.12 | 8.21 | 64.01 | 7.24 | 0 |
| 3. | Desmophen XP-7076 | 31.50 | 4.32 | 31.50 | 4.32 | 0 |
| 4. | BYK 307 10% IN EA | 0.95 | 0.13 | 0.09 | 0.01 | 0 |
| 5. | Byk-321 | 0.00 | 52 | 7.51 | 7.52 | 0 |
| 6. | Acetate | 94.30 | 12.94 | 0.00 | 0.00 | 0 |
| 7. | Desmodur XP-7100 | 475.73 | 50.08 | 475.73 | 50.08 | 0 |
| 8. | Total | 888.39 | 100.00 | 785.88 | 85.95 | |

| | | | | |
|---|---|---|---|---|
| Weight Solids, ⅔ = | 88.46 | Weight/gallon = | | 8.88 |
| Volume Solids, ⅓ = | 85.95 | NCO:OH Ratio = | | 1.90 |
| P/B Ratio = | 0.00 | Mix Ratio = | | 1.00 |
| PVC, % = | 0.00 | VOC, lbs/gal = | | 3.03 |

Raw Material
1. a polyaspartic ester from Bayer Material Science, Pittsburgh, PA.
2. a polyaspartic ester from Bayer Material Science, Pittsburgh, PA.
3. a polyaspartic ester from Bayer Material Science, Pittsburgh, PA.
4. a silicon surface additive from BYK Chemie, Wessel, Germany
5. a silicon surface additive from BYK Chemie, Wessel, Germany
6. Acetate
7. an aliphatic polyisocyanate from Bayer Material Science, Pittsburgh, PA.

EXAMPLE 10

Childlife Green

In this example coatings having a childlike green finish were prepared as follows:

| CHILDLIFE GREEN POLYOL | | |
| --- | --- | --- |
| # Raw Material | QUANTITY | UNITS |
| DESMOPHEN NH1420 (XP-7053) DA- | 82.86 | Lb |
| ASPARTIC YELLOW OXIDE SHADE PA | 51.79 | Lb |
| GREEN ASPARTIC SHADE PASTE | 60.00 | Lb |
| ASPARTIC BLACK SHADE PASTE | 30.00 | Lb |
| WOLLASTACOAT M-400 (10012) | 273.59 | Lb |
| DESMPHEN 1220 | 54.45 | Lb |
| BYK 307 10% IN ACETATE | 0.77 | Lb |
| T-12 (10% IN PMA) | 1.27 | Lb |
| ACETATE 99% | 16.04 | Lb |

1. a polyaspartic ester from Bayer Material Science, Pittsburgh, Pa.
2. color shade
3. color shade
4. color shade
5. color shade
6. a surface modified wollastonite from NYCO, Calgany, Alberta, Canada
7. a polyaspartic ester from Bayer Material Science, Pittsburgh, Pa.
8. a silicone surface additive from Byk Chemie, Wessel, Germany
9. a tin catalyst
10. Acetate

| PHYSICAL PROPERTIES | |
| --- | --- |
| DESCRIPTION | VALUE |
| TOTAL WEIGHT | 880.864 |
| TOTAL VEH WT % | 100.000 |
| PIGMENT WT % | 0.000 |
| VOLATILE WT % | 30.000 |
| ORG. SOLV. WT % | 30.000 |
| SOLIDS WT % | 70.000 |
| VEH SOLIDS WT % | 70.000 |
| DENSITY | 8.809 |
| BULKING FACTOR | 0.114 |
| P/B RATIO | 0.000 |
| CPSFA @ 1 MIL | 0.0265 |
| MATERIAL VOC | 316.662 |
| TOTAL VOLUME | 100.000 |
| TOTAL VEH VOL % | 100.000 |
| PIGMENT VOL % | 0.000 |
| VOLATILE VOL % | 35.094 |
| ORG. SOLV. VOL % | 35.094 |
| SOLIDS VOL % | 64.906 |
| VEH SOLIDS VOL % | 64.906 |
| SPEC. GRAVITY | 1.058 |
| P.V.C. % | 0.000 |
| SPREAD @ 1 MIL | 1041.089 |
| COATING VOC | 316.662 |

| CHILDLIFE GREEN ACTIVATOR | | |
| --- | --- | --- |
| # RAW MATERIAL | QUANTITY | UNITS |
| DESMODUR N-100 (TOLONATE HDB) | 616.61 | Lb |
| ACETATE 99% | 264.26 | Lb |

1. an aliphatic polyisocyanate from Bayer Material Science, Pittsburgh, Pa.
2. ethyl acetate

| PHYSICAL PROPERTIES | |
| --- | --- |
| DESCRIPTION | VALUE |
| TOTAL WEIGHT | 629.948 |
| TOTAL VEH WT % | 44.389 |
| PIGMENT WT % | 55.611 |
| VOLATILE WT % | 3.331 |
| ORG. SOLV. WT % | 2.728 |
| SOLIDS WT % | 96.669 |
| VEH SOLIDS WT % | 41.057 |
| DENSITY | 13.295 |
| BULKING FACTOR | 0.075 |
| P/B RATIO | 0.354 |
| CPSFA @ 1 MIL | 0.0180 |
| MATERIAL VOC | 43.455 |
| TOTAL VOLUME | 47.384 |
| TOTAL VEH VOL % | 70.363 |
| PIGMENT VOL % | 29.637 |
| VOLATILE VOL % | 5.988 |
| ORG. SOLV. VOL % | 4.793 |
| SOLIDS VOL % | 94.012 |
| VEH SOLIDS VOL % | 64.375 |
| SPEC. GRAVITY | 1.597 |
| P.V.C. % | 31.524 |
| SPREAD @ 1 MIL | 1507.950 |
| COATING VOC | 43.980 |

EXAMPLE 11

Gloss White Over Zinc Rich Primer

In this example Gloss White coatings of the present invention were topcoated over a zinc rich moisture cure urethane (i.e. zinc rich urethane-ZRU) primer.

| ZRU PRIMER | |
| --- | --- |
| Finish: | Flat |
| Color: | Gray |
| Volume Solids: | 63% ± 2% |
| Weight Solids: | 87.9% ± 2% |
| Theoretical VOC: | <340 g/l: 2.8 lbs/gal |
| Zinc Content in Dry Film: | 86% ± 2% |
| Theoretical Coverage | |
| Wet mils: | 3.0 to 8.0 |
| Dry mils: | 2.0 to 5.0 above profile |
| Coverage: | 202 to 336 sq ft theoretical |
| Drying Schedule @ 5.0 mils wft 77° F. 5% RH: | |

| | Unaccelerated | Accelerated |
| --- | --- | --- |
| To Touch: | 20 minutes | 5 minutes |
| To recoat: atmospheric | 4–6 hours | 5 minutes |
| To cure: atmospheric | 3 days | 6–8 hours |

Drying time is temperature, humidity and film thickness dependent.

-continued

| ZRU PRIMER | |
|---|---|
| Shelf Life: | 6 months unopened |
| | Store indoor at 40° F.–100° F. |

| GLOSS WHITE TOPCOAT | |
|---|---|
| Finish: | Gloss White |
| Volume Solids: | 53.5%–85.5% ± 2% |
| Weight Solids: | 60%–88% ± 2% |
| Theoretical VOC: | <384 g/l: 3.2 lbs/gal* |
| Typical Exampel - can vary based on customer requirements with higher solids lower VOC capability. | |
| Mix Ratio: | 1:1 to 2:1 |
| Induction Time: | None |
| Theoretical Coverage: | |
| @ 57% Volume Solids equals 914 sq ft @1 mil DFT | |
| Shelf Life: | 12 months unopened |
| | Store indoor at 40° F.–100° F. |
| Hardness: | H–2H |
| Direct Impact: | >320 inch/lbs |
| Reverse Impact: | >160 inch/lbs |
| Conical Mandrel: | ⅛" pass |
| Gravel-O-Meter: | 5+ |
| Graffiti and Chemical Resistance: | Good |
| Salt Spray Direct: | |
| B-1000 @ 2.5 mils DFT Gloss White @ 2.5 mils DFT | >500 hours |
| Over 3.5 mils DFT ZRU | >10,000 hours |
| Drying Schedule @ 2.0 mils WFT | |
| | 77° F. 50% RH |
| To Touch: | 20 minutes |
| To Handle: | 40 minutes |
| Drying time is temperature, humidity and film thickness dependent. | |
| Weathering: | |

| QUV-A Gloss White | | |
|---|---|---|
| | 60 Gloss | D E* |
| Initial | 2400 hours | 2400 hours |
| 92 | 88 | <2.0 |

| Florida Gloss White | | |
|---|---|---|
| | 60 Gloss | D E* |
| Initial | 24 months | 24 months |
| 92 | 87 | <2.5 |

RECOMMENDED USES

On steel, aluminum and galvanized where resistance to rust and corrosion undercutting is required
As a primer for urethane coatings system
Low temperature cure application
As a spot primer on hand and power tool cleaned surfaces
Product Finish
Structural Steel
General Maintenance
Industrial and Transportation From the above examples, it can be seen that the properties of the polyurea coating compositions of the present invention begin improving as the polyaspartic ester is over indexed with polyisocyanate at above a 1.00 and continues to improve up to a stoichiometric index of about 2.25, after which the properties maintain the level of improvement.

Although the present invention has been described with reference to particular means, materials and embodiments, from the foregoing description, one skilled in the art can easily ascertain the essential characteristics of the present invention and various changes and modifications can be made to adapt the various uses and characteristics without departing from the spirit and scope of the present invention as described above and set forth in the following claims.

What is claimed is:

1. A coated object comprising:
   a substrate; and
   a coating on said substrate which comprises a cured non-aqueous polyurea coating composition comprising a polyaspartic ester and a polyisocyanate, wherein the polyisocyanate is present in an amount that is greater than a normal stoichiometric amount for the polyaspartic ester prior to curing, such that the coating composition provides a hybrid curing system that combines the fast cure of a polyaspartic ester polyurea reaction with the enhanced adhesion and superior film properties of a slower moisture cure polyurea wherein the coating composition cures dry to handle after air drying at 72° F. and 40% relative humidity in less than 120 minutes.

2. A coated object according to claim 1, wherein the polyaspartic ester is over indexed with the polyisocyanate above 1.5 of NCO to NH.

3. A coated object according to claim 1, wherein the polyaspartic ester comprises a blend of polyaspartic esters.

4. A coated object according to claim 3, wherein said blend includes aldimine.

5. A coated object according to claim 1, wherein the polyisocyanate is a member selected from the group consisting of aliphatic polyisocyanates, alicyclic polyisocyanates, aromatic polyisocyanates, and mixtures thereof.

6. A coated object according to claim 1, wherein the polyisocyanate is a member selected from the group consisting of aliphatic polyisocyanates, alicyclic polyisocyanates, aromatic polyisocyanates, and mixtures thereof.

7. A coated object to claim 6, wherein the polyisocyanate comprises an aliphatic polyisocyanate.

8. A coated object according to claim 1, wherein said substrate has been initially coated or treated prior to applying said coating.

9. A coated object according to claim 8 further including an intercoating of a cured non-aqueous polyurea coating composition such that said coating is a recoat as applied.

10. A coated object accordingly to claim 8, wherein said substrate has a zinc rich urethane coating applied prior to topcoating with said coating.

11. A coated object according to claim 1, wherein said coating contains a pigment.

12. A coated object according to claim 11, wherein said pigment is titanium dioxide.

13. A coated object according to claim 11, wherein said pigment is a metallic silver pigment.

14. A coated object according to claim 1, wherein said coating composition further includes a tin catalyst.

* * * * *

UNITED STATES PATENT AND TRADEMARK OFFICE
CERTIFICATE OF CORRECTION

| | |
|---|---|
| PATENT NO. | : 7,169,876 B2 |
| APPLICATION NO. | : 11/017299 |
| DATED | : January 30, 2007 |
| INVENTOR(S) | : Richard E. Asher |

It is certified that error appears in the above-identified patent and that said Letters Patent is hereby corrected as shown below:

On Title page Item "(73) Assignee: Freda Incorporated, Angola, IN (U)" should read --(73) Assignee: Freda Incorporated, Angola, IN (US) and Richard E. Asher, Lewis Center, OH (US)--

Signed and Sealed this

Twenty-eighth Day of August, 2007

JON W. DUDAS
*Director of the United States Patent and Trademark Office*